Figure 1:
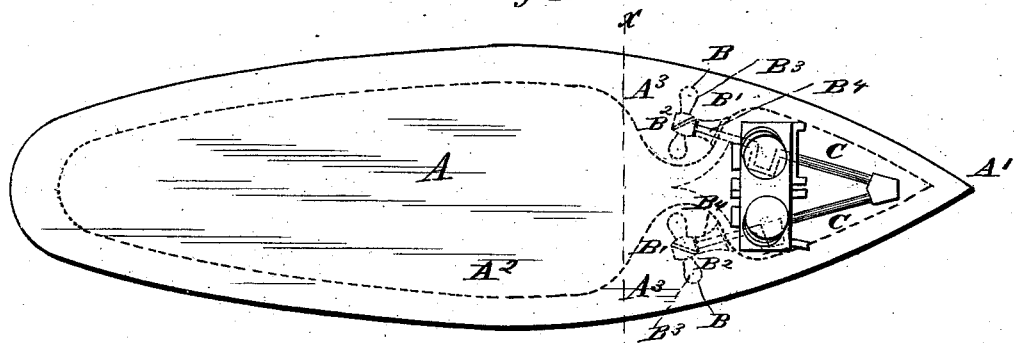

(No Model.) 4 Sheets—Sheet 1.

Z. ORAM.
SHIP'S HULL AND PROPELLER.

No. 298,019. Patented May 6, 1884.

WITNESSES
P. C. Dieterich
Fred G. Dieterich

INVENTOR
Zachariah Oram
per Lloyd Wiegand, Attorney (No Model.) 4 Sheets—Sheet 2.
Z. ORAM.
SHIP'S HULL AND PROPELLER.
No. 298,019. Patented May 6, 1884.
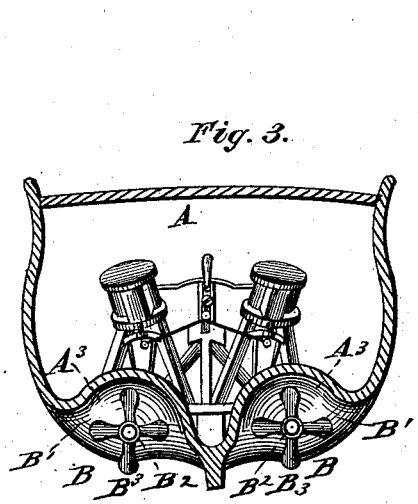
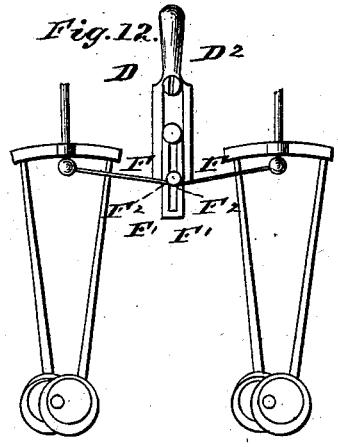
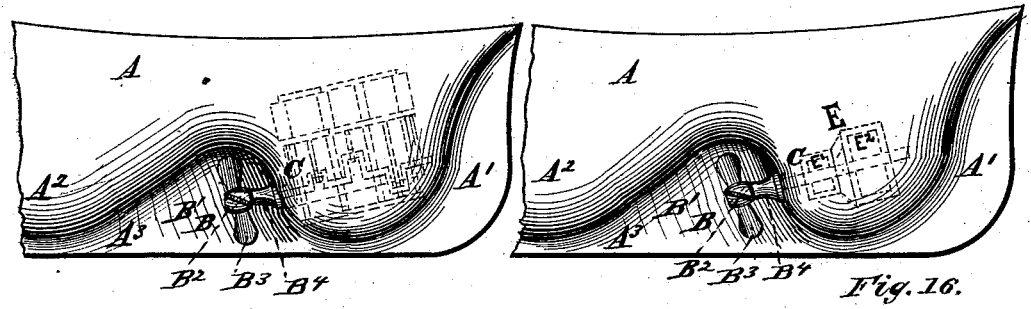
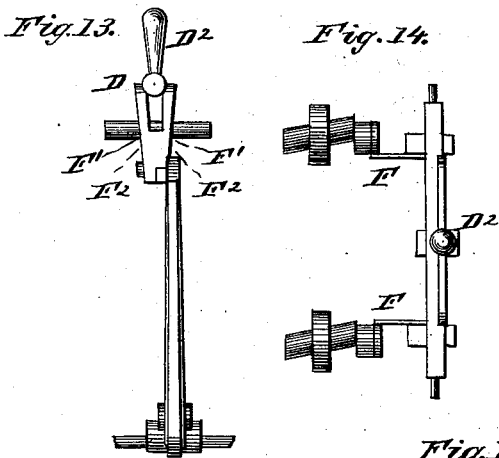
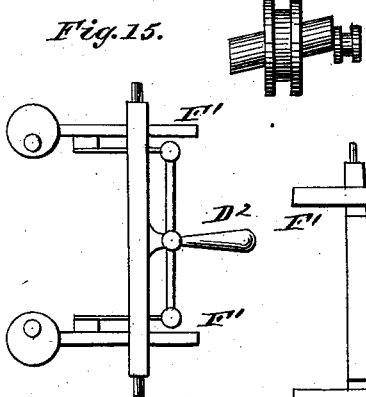
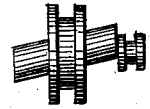
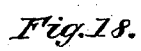
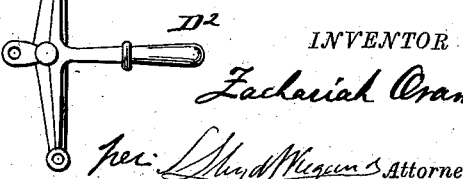
WITNESSES
INVENTOR
Zachariah Oram
per: Attorney (No Model.)
4 Sheets—Sheet 3.
Z. ORAM.
SHIP'S HULL AND PROPELLER.
No. 298,019. Patented May 6, 1884.
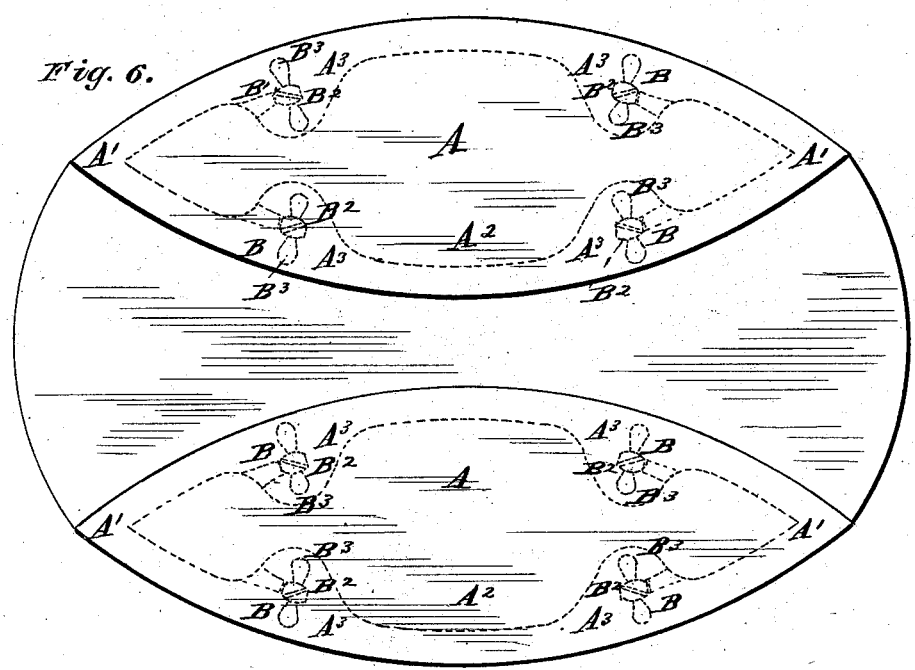
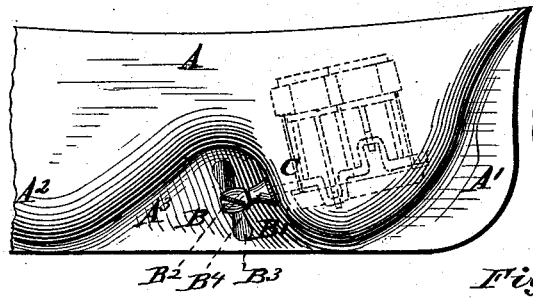
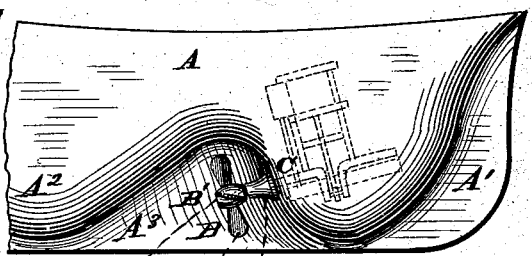
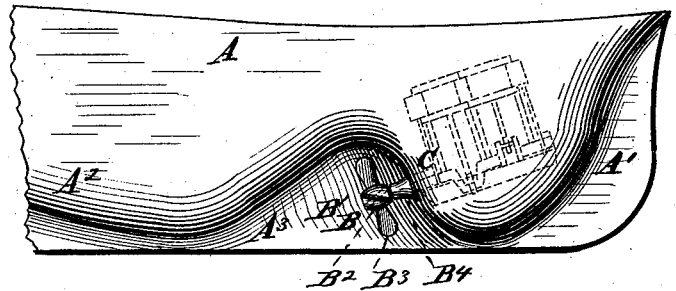
WITNESSES.
INVENTOR
Zachariah Oram
per S. Lloyd Wiegan, Attorney (No Model.)

Z. ORAM.

SHIP'S HULL AND PROPELLER.

No. 298,019.  Patented May 6, 1884.

UNITED STATES PATENT OFFICE.

ZACHARIAH ORAM, OF PHILADELPHIA, PENNSYLVANIA.

SHIP'S HULL AND PROPELLER.

SPECIFICATION forming part of Letters Patent No. 298,019, dated May 6, 1884.

Application filed January 20, 1883. Renewed October 5, 1883. (No model.)

*To all whom it may concern:*

Be it known that I, ZACHARIAH ORAM, a citizen of the United States, residing at Philadelphia, in the county of Philadelphia and State of Pennsylvania, have invented certain new and useful Improvements in Ships' Hulls and Propellers; and I do hereby declare the following to be a sufficiently full, clear, and exact description thereof to enable others skilled in the art to make and use the said invention.

This invention relates to vessels propelled by screws, and has for its object the avoidance of resistance to the progress of the vessel through the water, a better economy and more complete utilization of the propelling-power, an increase in the buoyancy of the vessel and more rapid velocity of the vessel than has heretofore been attained with the same expenditure of propelling force, and also a greater facility of turning, reversing, and changing the direction of the course of the vessel more promptly than has been practicable with a mere steering apparatus.

The nature of this invention consists in an improved shape of hull, by which provision is made for a different location and operation of propellers in concavities or recesses, and more effectual and certain access of water to the propelling apparatus, thus avoiding the racing consequent upon the disengagement of the propeller from the water; the combination of propellers with such cavities, so as to make a downward and outward reaction; the combination of propellers susceptible of rotation independently, located on both sides of the vessel; the combination of such propellers with the shaft of the motors or engines, so that the motor and propeller have the same shaft in common of shafts connected together without the intervention of gearing; the combination of such propellers with engines susceptible of independent rotation, and at the same time susceptible of connection by their valve-operating mechanism, so that they may, at the option of the engineer, have the same velocity automatically maintained, or may be run in different directions simultaneously and with different velocities automatically, at relative rates to each other, determined by the adjustment of the valve-operating mechanism in the control of the engineer.

This invention is applicable with especial advantages to vessels of war, securing for them a celerity in moving and turning hitherto unequaled with the same weight of apparatus and expenditure of power.

I will now proceed to particularly describe the mode of making and using this invention, referring in so doing to the drawings annexed.

Figure 2:
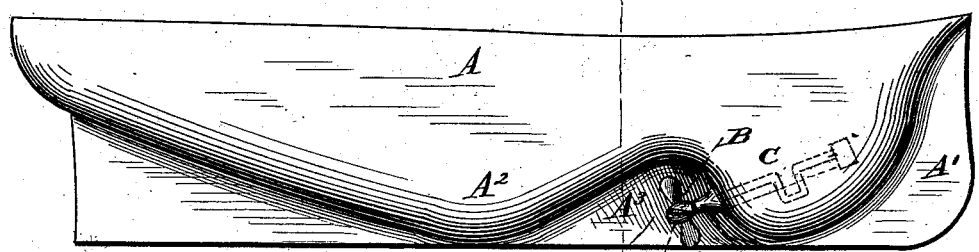
Figure 4:
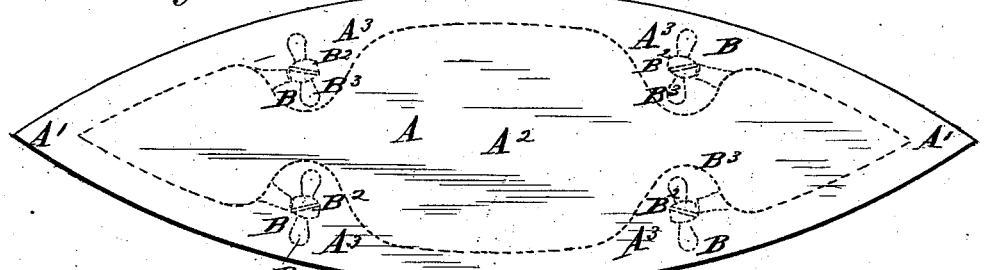
Figure 5:
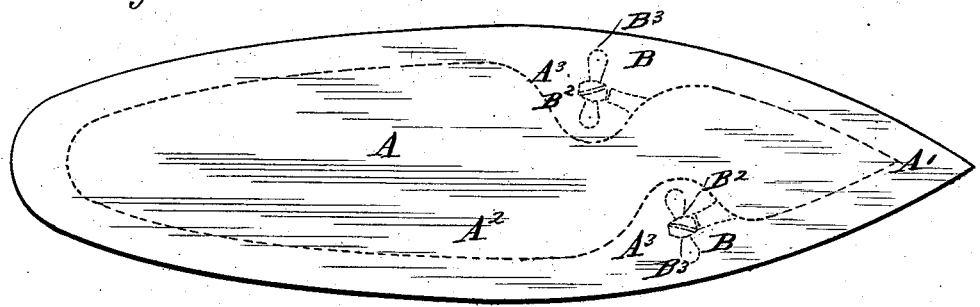
Figure 19:
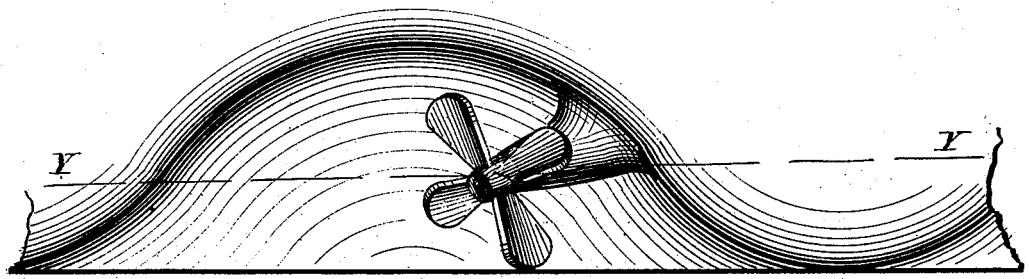
Figure 20:
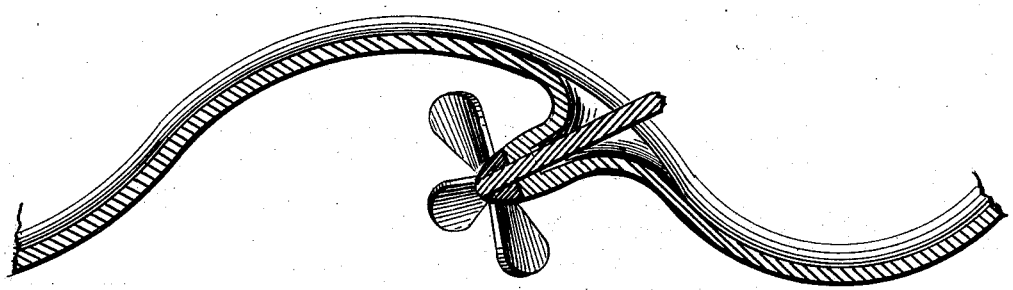

Figure 1 shows a plan; Fig. 2, a side elevation; Fig. 3, a cross-section on the line $x\ x$ in Figs. 1 and 2. Figs. 4, 5, and 6 show modifications thereof, and Figs. 7, 8, 9, and 10 modifications of the detail of the motors or engines and propellers. Fig. 11 indicates a direct rotary engine applied thereto. Figs. 12, 13, 14, 15, 16, 17, and 18 illustrate the connecting valve-operating mechanism of the motors or engines. Figs. 19 and 20 show, respectively, in side elevation and in horizontal section the propeller and surrounding portion of the hull, drawn on an enlarged scale, the plane of the section in Fig. 20 being indicated by the dotted line marked $y\ y$ in Fig. 19.

The same letters of reference apply to the same parts in the several figures.

A represents the hull of the vessel; A', the bow thereof.

$A^2$ denotes the midship section of the vessel.

$A^3$ indicates recesses or cavities formed in the hull A, forward of midship section, the form of which cavity is in curved lines or surfaces, permitting an easy flow of water into said cavities from the forward underneath portion and sides of such cavities, and the easy turning of such current, and the downward and outward discharge thereof in a direction parallel or downwardly and outwardly divergent therefrom.

B represents the propellers of the kind known as "screw-propellers," the axes of which are obliquely directed downwardly and outwardly toward the stern. A space, B', is provided between the forward portion of the cavities $A^3$ and the propellers B, into which spaces water can readily pass to the propellers in the direction indicated by the arrows in the drawings. The propellers have their blades inclined in such direction that during the forward propulsion of the vessel the blades which are outward are descending, while those which are inward or toward the center line of the vessel are rising. The form of the cavity aft of each propeller is such as to freely discharge the water from the propeller without abrupt change in its direction, so that it reacts upon the water in which the vessel is floating obliquely downward and outward toward the after part of the vessel, thus measurably relieving the pressure of water upon the sides and bottom of the boat, and forcibly by the backward reaction projecting the boat forward through the water. The hub $B^2$ of the propeller B should be made in the form of a prolate spheroid, having the arms or blades $B^3$ attached thereto or made in one piece therewith, and strongly filleted at their point of juncture with the hub. The boss or tube $B^4$, through which the propeller-shaft projects from the hull of the vessel, should be made conical, and at the line of juncture with the hull should be filleted, as shown in the drawings, Fig. 2, so as to avoid any sharp angles, which might produce eddies or breaks in the current passing in the cavity $A^3$ to the propeller. The shaft C of the propeller extends into the hull of the vessel, and provided therein with a thrust-bearing, and forms a component part of the engine-shaft. The engine, as shown in Fig. 7, has a crank formed in the shaft and direct-acting cylinder-piston and connecting-rod applied thereto. As shown in Fig. 8, two cylinders are employed with cranks placed diametrically opposite, so as to form the usual type of direct-acting compound marine engine. As shown in Fig. 9, two cylinders are applied having pistons and connecting-rods engaging upon cranks placed at right angles with each other, thus forming a readily-reversible engine.

Fig. 10 shows three cranks formed in the shaft at angles of one hundred and twenty degrees to each other, to which are applied connecting-rods, cylinders, and pistons, making readily-reversible compound engines.

The shaft of each propeller may be advantageously made angularly adjustable in the sleeve, through which it passes from the interior of the vessel to the water, by having a second sleeve containing the stuffing-box fitted with either a ball-and-socket fluid-tight joint or an elastic or flexible joint, in which case the bed-plate and shaft-bearing of the engines are susceptible of adjustment vertically and horizontally about a fulcrum located at or near the point of passage of the shaft and stuffing-box through the hull of the vessel. By this arrangement the direction of the angle of action and reaction can be varied, adjusted, and controlled to meet the varying requirements of propulsion and buoyancy.

The engine E (shown in Fig. 11) is a direct-acting rotary machine, consisting of two engines having revolving pistons, E and $E^2$—both upon the same shaft—which pistons are of unequal displacement, and the supply of steam is admitted to the engine-piston of the smallest displacement at first, and afterward discharged from the cylinder containing the smallest piston displacement, and from thence exhausted to the condenser, thus forming a direct-acting rotary compound engine. Each separate propeller B has its own separate shaft and driving-engine distinct and separate, as far as shaft-connection is concerned.

In Fig. 3, D represents a valve-operating mechanism, by which the several engines are connected. This valve-operating mechanism embraces a link-motion on each engine, consisting of the usual elements of eccentric-rods and shifting-links connected therewith, as shown in Figs. 12 and 13, or, instead thereof, an adjustable and reversible eccentric, as shown in Figs. 14 and 15, the several valve-motions connected by a series of links and levers operated by a single rock-shaft, $D'$, and lever $D^2$, controlled by the engineer, so that when placed in central position the several reversing and cut-off mechanisms shall all receive steam to an equal extent and distribute the steam equally to the several engines. When the lever is placed to one side or the other of central position, the adjustment of the shifting-links is changed, so that more steam is furnished to one engine than the other, and the engine so supplied with steam is accelerated in velocity, while the other engine with a diminished supply of steam is retarded.

The connection of the links or equivalent reversing and cut-off gear on each engine is made so that it can be reversed in connection with the rock-shaft $D'$ and lever $D^2$, controlled by the engineer, and the same manipulations are then practicable for operating the vessel by each, either or both of its engines in reverse direction.

The link F, connecting the shifting-link of each engine in this arrangement, is not fastened permanently to the double arm or lever $F'$ on the rock-shaft $D'$, but to a block, $F^2$, which slides in a slot extending to both arms of the lever $F'$, and by moving the block to either arm the engine-link so connected is reversed in action by the motion of the lever $D^2$ from the action that would occur when the block $F^2$ is engaged in the other arm of the lever $F'$.

The propellers, as shown in Figs. 1, 2, and 3, are located symmetrically with their containing-cavities. In Fig. 4 they are placed symmetrically, but at both ends of the vessel. Shown in this figure is what is known as a "double-ended" vessel, having two bows, and is adapted to sail in either direction, such construction being specially adapted to monitors and other armor-clad vessels. In the form shown in Fig. 5 the cavities $A^3$ are not placed symmetrically, nor are the propellers located symmetrically upon the vessel, but, on the contrary, placed somewhat aft of each other, so as to afford better arrangement for spaces inside of the vessel to contain the machinery. In the form shown in Fig. 6 the propellers and their containing-cavities are arranged upon a vessel having double hulls, so that the vessel may be rotated in the water or propelled in either direction of the line of their keels.

The oblique downward thrust produced by the propellers produces a lifting effect, which facilitates the motion of the vessel, and, by reason of the propellers being located near to the engines or motors, a more prompt action in changing the course of the vessel is effected.

Having described my invention and the mode of operating the same, what I claim therein as new and originally as my invention is—

1. The combination of a vessel having concavities forward of the midship section and below the water-line with two or more screw-propellers having an oblique downward and outward thrust, located wholly or partially in such concavities, and rotated separately and independently by motors having a driving-shaft in common with each propeller, substantially as and for the purpose set forth.

2. The combination of a vessel having concavities in the hull forward of the midship section and below the water-line, adapted to receive and guide the currents of water to and from screw-propellers located wholly or partially therein, with the screw-propellers having a downward and outward direction of thrust toward the stern of the vessel, and susceptible of independent rotation, substantially as and for the purpose set forth.

3. The combination of independent engines susceptible of varying and adjustable regulation of speed and direction of motion relatively to each other with propellers located in cavities of a vessel forward of the midship section, and having downward and outward rearward thrust, as and for the purpose set forth.

4. The combination, in a vessel adapted to sail in either direction of its length of keel, of two or more sets of screw-propellers having their axes inclined outwardly and downwardly toward the midship section of the vessel, located wholly or partially in concavities, substantially as and for the purpose set forth.

5. In a vessel having two or more hulls combined in parallel position, the combination of a series of two or more independent engines with screw-propellers having their axes inclined outwardly and downwardly toward the midship portion, such propellers located in or partially within cavities formed in said hulls aft of the bows and forward of the midship section.

6. In a vessel propelled by power internally applied, the combination of screw-propellers located forward of the midship section with projections in the form of zones or segments of prolate spheroids, surrounded by receding curved surfaces, substantially as shown and described.

ZACHARIAH ORAM.

Witnesses:
 LINN WHEELER,
 J. DANIEL EBY.